Nov. 11, 1952 G. L. VON ESCHEN 2,617,615
FLIGHT CONTROL APPARATUS
Filed March 15, 1948 3 Sheets-Sheet 2

Inventor
GARVIN L. VON ESCHEN

George H. Fisher
Attorney

Patented Nov. 11, 1952

2,617,615

UNITED STATES PATENT OFFICE 2,617,615

FLIGHT CONTROL APPARATUS

Garvin L. Von Eschen, Columbus, Ohio, assignor to Minneapolis-Honeywell Regulator Company, Minneapolis, Minn., a corporation of Delaware Application March 15, 1948, Serial No. 14,847

19 Claims. (Cl. 244—77)

1

This invention is concerned with the control of an aircraft in flight.

An object of this invention is to provide apparatus for stabilizing an aircraft in flight about its roll, pitch and turn axis.

The aircraft as provided with the apparatus is stabilized about its turn axis by a deviation responsive means which senses any departure of the heading of the aircraft from a desired heading. When such departure occurs a control signal from the deviation responsive means is effective to cause the operation of the ailerons of the aircraft. The operation of the ailerons results in the banking of the plane. The banking of the aircraft causes a change in the direction of heading of the aircraft until such time as the desired heading is resumed by the aircraft.

A further object of this invention is to provide manual means for causing the airplane to be placed in the bank whereby the direction of movement of the aircraft may be selectively changed.

A further object of this invention is to provide control means for the rudder which is effective when the aircraft is in flight to remove any angular difference between the direction of movement of the aircraft and the relative direction of movement of the air.

A further object of this invention is to provide control apparatus for the rudder which is responsive to a plurality of signals. One control signal is determined by the angle between the longitudinal axis of the craft and the relative direction of movement of the aircraft and the air, a second signal is determined by the speed of operation of the means responsive to the angular difference, and a third signal is determined by the rate of movement of the aircraft about an axis.

A further object of this invention is to provide in a control apparatus for the rudder a means responsive to the angular difference between the direction of movement of the aircraft and the air, a means responsive to the speed of operation of said first means, and a means responsive to the rate of turn of the aircraft about an axis.

A further object of this invention is to provide in a control apparatus for the rudder a means operated whenever there is an angular difference between the direction of movement of the aircraft and the direction of movement of the air, a gyroscope precessed by said first means in accordance with the speed of operation of said first means and a gyroscope responsive to the rate of turn of said aircraft about an axis.

A further object of this invention is to provide in a control apparatus for the rudder a means

2 responsive to the angular difference between the direction of movement of the aircraft and the air, said apparatus including a gyroscope means operated by said first means and precessed thereby in accordance with the speed of operation of said first means and a second gyroscope means responsive to the rate of turn of said aircraft about an axis and whereby said gyroscope means may be constituted by a single gyroscope which is precessed in accordance with the speed of operation of said first means and which is also precessed in accordance with the rate of rotation of the aircraft about an axis.

A further object of this invention is to control the operation of the rudder by a mechanism, which exerts a control effect which is proportional to a time function of a movement which causes its operation.

A further object of this invention is to control the operation of the rudder by means of a device whose effect is proportional to the time function of two distinct rotations applied to the device in which said rotations aid one another in control of the rudder one time and oppose one another at another time.

A further object of this invention is to determine the control effect of a device for controlling the rudder, in response to the rotation of a motor which incorporates an antihunting control means.

A further object of this invention is to determine the control effect of the device for controlling the rudder, in accordance with the rotation of the airplane about one of its axes.

A further object of this invention is to provide in a flight control apparatus for an aircraft whose direction of movement is under the control of a deviation responsive means or a manually controlled means, a vertical gyroscope which coacts with the deviation responsive means or manual control means in the operation of the ailerons of the aircraft and which vertical gyroscope also controls the operation of the elevators for the aircraft.

Further objects of the invention may be determined by reference to the specification and drawing showing one embodiment thereof. The invention however is not to be limited to the actual embodiment illustrated, but is only to be measured by the statements in the claims.

Figure 1:
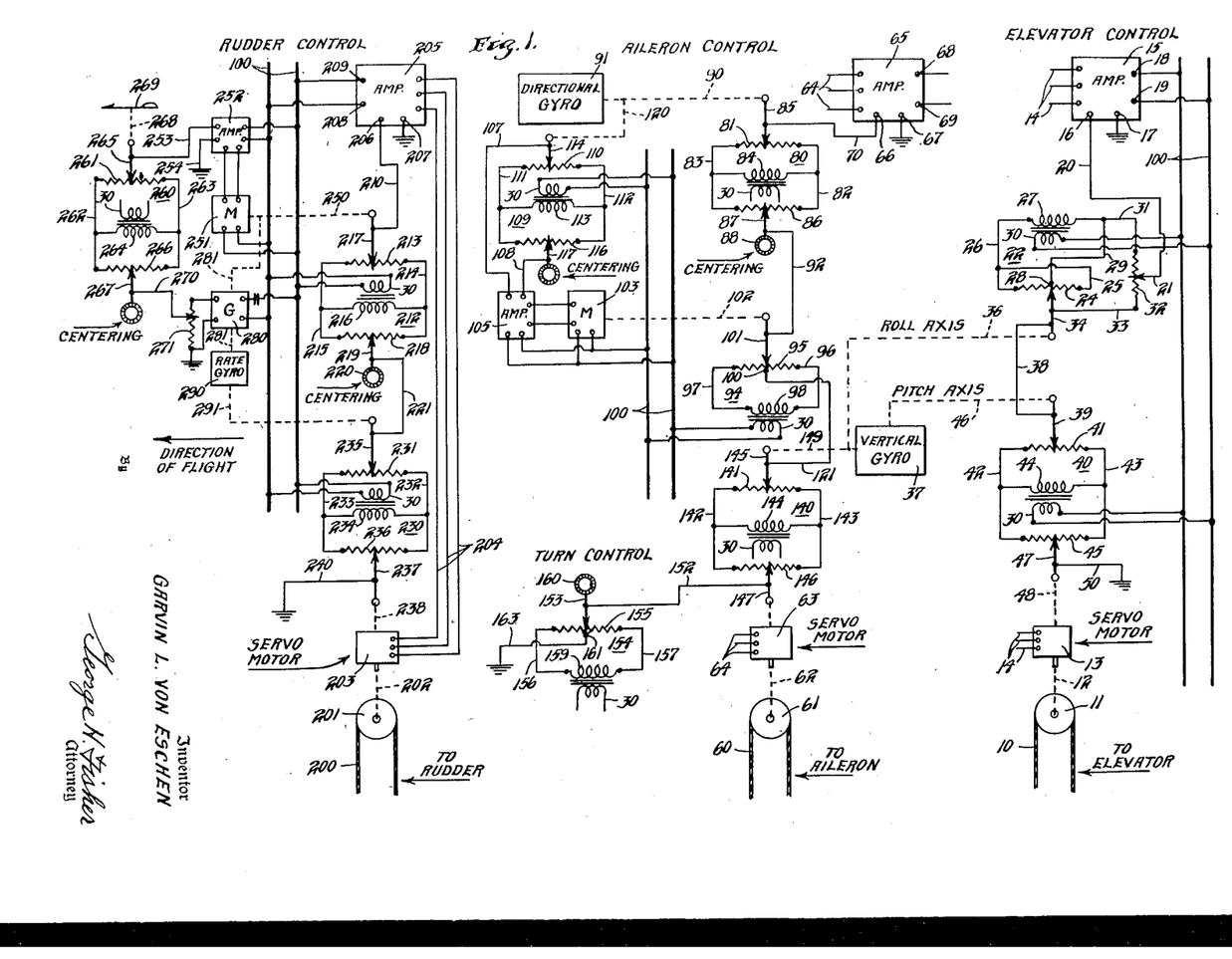
Figure 1 is a schematic view of a flight control apparatus which embodies the principles of the present invention.

The apparatus, as shown in Figure 1 which is one embodiment of the invention, has been applied to operate the control surfaces of a conventional airplane. The conventional airplane is provided with a rudder, ailerons, and elevator which control the movement of the airplane about three respectively perpendicular axes. The respective control channels for the rudder, ailerons, and elevator are indicated in Figure 1. The individual control channels will be separately described.

Elevator channel network

Considering first the elevator channel, the elevators, which are not shown, are operated by cables 10 which extend from a cable drum 11. Cable drum 11 is driven by means of an operative shaft 12 from a servomotor 13. The servomotor 13 may be of the type disclosed in the application of Willis H. Gille, Serial No. 447,989, filed June 22, 1942. The servomotor 13 may reversibly drive shaft 12 and is controlled from an amplifier 15.

The amplifier 15 may also be of the type disclosed in the above mentioned Gille application. The direction of rotation of servomotor 13 depends upon and varies with the phase relationship between an input control signal applied between terminals 16 and 17 of amplifier 15 and a signal applied between terminals 18 and 19 connected to power leads 100 extending from a source of voltage. The source of voltage may be an inverter (not shown).

The signal applied between terminals 16 and 17 is derived from a circuit which includes voltage sources and which extends from terminal 16 through lead 20, an impedance network 22, lead 38, an impedance network 40, lead 50 to ground, and to grounded terminal 17 of amplifier 15.

The impedance network 22 is a source of control voltage and comprises an up elevator potentiometer having a resistor 24 which has one of its ends connected through lead 26 to one end of a secondary winding 27 of a transformer having a primary winding 30. Since in the networks to be recited the several secondary windings may have a common primary winding, the primary winding is indicated in each instance by the reference character 30. The opposite end of resistor 24 is connected by means of leads 25 and 26 to the same end of secondary 27 as the first recited end of resistor 24. The opposite end of secondary winding 27 is connected by means of lead 29 to a center tap 28 of resistor 24. A wiper 34 may be variably positioned along the surface of resistor 24. In normal position wiper 34 is at the center tap 28 of resistor 24. It may be seen that irrespective of the direction in which wiper 34 is moved with respect to center tap 28, the voltage between wiper 34 and the center tap 28 will have the same phase. Wiper 34 is connected through lead 33 to one end of a resistor 32. The center tap is connected through leads 29 and 31 to the opposite end of resistor 32. A wiper 21 may be adjusted along the surface of resistor 32. If wiper 34 be moved with respect to center tap 28, the voltage between wiper 34 and center tap 28 arising out of such movement is applied across the ends of resistor 32. The wiper 21 may be adjusted to select any desired portion of this voltage.

The impedance network 40 is in the form of a Wheatstone bridge. Two arms of this bridge are formed by a pitch axis deviation potentiometer having a resistor 41 which has its opposite ends connected by leads 42 and 43 to the respective ends of a secondary winding 44 of a transformer having a primary winding 30. A contacting wiper 39 may be positioned along the surface of resistor 41. The other two arms of the bridge are formed by a servo balance potentiometer having a resistor 45 whose opposite ends are connected to the respective ends of secondary winding 44 by means of leads 42 and 43. A wiper 47 may be adjusted along the surface of resistor 45. In normal position the wiper 39 and wiper 47 are at the electrical center of their respective resistors 41 and 45, with no potential difference between the wipers.

In the position illustrated in Figure 1 the elevator control network is in balanced condition, since the networks 22 and 40 have their respective wipers centered, with the elevators in central position. The elevator control network may be unbalanced by movement of wiper 39 which sets up a difference of potential between wiper 39 and wiper 47. The movement is derived through an operative connection 46 from a vertical gyro 37. Vertical gyro 37 may be of the type disclosed in the aforesaid application 447,989, filed June 22, 1942. The operative connection 46 receives the movement whenever the aircraft moves about its pitch axis. The direction of movement applied to wiper 39 depends upon the direction of movement of the aircraft about its pitch axis. If the aircraft tilts downward about its pitch axes, the wiper 39 is moved in one direction, and if the aircraft tilts upward about its pitch axis the wiper 39 is moved in the opposite direction from the electrical center of resistor 41. Any movement given to wiper 39 unbalances the impedance network 40. A voltage arising from the unbalance of impedance network 40 is applied to input terminal 16 through lead 38, impedance network 22, lead 20, to terminal 16. The input circuit is completed through wiper 47, lead 50 to ground and to grounded terminal 17 of amplifier 15. The amplifier responding to the control signal voltage thereupon operates and effects the rotation of servomotor 13 in one direction depending upon the phase relationship between the input voltage and the voltage of the source. The rotation of motor 13 drives the cable drum which through cables 10 move the elevators. The servomotor 13, through an operating connection 48, also drives the wiper 47 along resistor 45 in the same direction as that applied to wiper 39 to such a position that there is no difference of potential between wiper 39 and wiper 47 when the network is balanced. Since wiper 47 and its resistor 48 not only serve to balance the impedance network 40 but the entire elevator control network, the resistor 45 and the wiper 47 are designated the servo balance potentiometer.

The elevator control network may also be unbalanced by the movement of wiper 34 which has an operative connection 36 extending from the vertical gyro 37. The connection 36 is moved by the vertical gyro 37 whenever the aircraft tilts about its roll axis. Movement of wiper 37 to either side of center tap 28 results in a potential difference developing between center tap 28 and wiper 34. This difference of potential is applied across resistor 32. The wiper 21 may select a desirable portion of this voltage and through lead 20 applies it to input terminal 16. The opposite side of the potential difference is applied through lead 33, lead 38, network 40, lead 50 to ground and to the grounded side of amplifier 15. Amplifier 15 thereby receives a voltage signal across input terminals 16, 17 and thereupon operates. The operation of the amplifier effects the rotation of servomotor 13. Servomotor 13 through shaft 12 drives the cable drum 11 and cables 10 extending therefrom to position the elevators. At the same time, the servomotor 13, through its operating connection 48, positions the wiper 47 to set up a potential between wiper 39 and wiper 47 equal and opposed to the voltage drop between wiper 34 and wiper 21. The amplifier 15 thereupon ceases to operate and the servomotor 13 stops rotating. The elevator control network is thereby balanced. Since the potential between wiper 34 and centertap 28 is of the same phase irrespective of the direction in which wiper 34 is moved, the servomotor 13 always applies up elevator in response to the signal arising from such movement.

*Aileron control network*

The ailerons (not shown) are driven by cables 60 attached thereto, which cables extend from the cable drum 61. Cable drum 61 is driven from the servomotor 63 through an operating shaft 62. The servomotor 63 is similar to the servomotor 13. Servomotor 63 is controlled by an amplifier 65 similar to amplifier 15. Amplifier 65 has signal input terminals 66 and 67. Amplifier 65 has terminals 68 and 69 which are connected to the conductors extending from the source of voltage. The output leads 64 of amplifier 65 extend to the servomotor 63.

The control circuit for amplifier 65 includes sources of control voltages and extends from terminal 66, lead 70, an impedance network 80, lead 92, an impedance network 94, lead 121, an impedance network 140, lead 152, an impedance network 154, lead 163, to ground, and to grounded terminal 67 of amplifier 65.

The impedance network 80 which is a source of control voltage is in the form of a Wheatstone bridge. Two arms of this bridge are formed by a course deviation potentiometer including a resistor 81 having its opposite ends connected by means of leads 82 and 83 to the respective ends of a secondary winding 84 of a transformer which has a primary winding 30. A wiper 85 may be variably positioned along the surface of resistor 81. The opposite two arms of the bridge are formed by a centering potentiometer having a resistor 86 whose opposite ends are connected by means of leads 82 and 83 to the respective ends of secondary winding 84. A wiper 87 may be manually adjusted along the surface of resistor 86. In normal position wiper 85 is at the electrical center of resistor 81 and wiper 87 is at the electrical center of resistor 86 at which time there is no potential difference between wiper 85 and wiper 87.

Impedance network 94 comprises a potentiometer having a resistor 95 whose opposite ends are connected by means of leads 96 and 97 to the respective ends of a secondary winding 98 of a transformer which has a primary winding 30. Resistor 95 has a center tap 100. A wiper 101 may be variably positioned along the surface of resistor 95. In normal position, wiper 101 is positioned at the center tap. When in such position, no difference of potential exists between wiper 101 and center tap 100.

Impedance network 140 is in the form of a Wheatstone bridge, two arms of which are formed by a roll axis deviation potentiometer having a resistor 141 which has its opposite ends connected by means of leads 142 and 143 to the respective ends of a secondary winding 144 of a transformer having a primary winding 30. A wiper 145 may be adjusted along the surface of resistor 141. The opposite two arms of the bridge are formed by a servomotor balance potentiometer having a resistor 146 which has its opposite ends connected by means of leads 142 and 143 to the respective ends of secondary winding 144. A wiper 147 may be adjusted along the surface of resistor 146.

The impedance network 154 comprises a turn control potentiometer having a resistor 155 which has its opposite ends connected through leads 156 and 157 to the respective ends of the secondary winding 159 of a transformer which has a primary winding 30. A wiper 153 may be manually adjusted over the surface of resistor 155 by means of a turn control knob 160. Resistor 155 has a center tap 161. This center tap as shown is of considerable width so that wiper 153 must be moved a predetermined extent before any potential difference may arise between wiper 153 and center tap 161.

In normal position, as shown, the individual networks are balanced and the aileron network is therefore balanced. The network 80 may be unbalanced by the operation of wiper 87 through a manual operating knob 88. Movement of wiper 87 causes a voltage difference to rise between wipers 85 and 87. This voltage difference is applied on the one hand from wiper 85 by means of lead 70 to input terminal 66 of amplifier 65. Wiper 87 is connected, on the other hand, by means of lead 92, network 94, lead 121, network 140, lead 152, network 154, lead 163, to ground, and to grounded terminal 67. The difference of potential between wiper 85 and wiper 87 is thereby applied to amplifier 65 which operates and effects the operation of servomotor 63. Servomotor 63 drives cable drum 61 to actuate the ailerons through cables 60. Servomotor 63 also through an operating connection 148 adjusts the wiper 147 of network 140 in an opposite direction from that given to wiper 87. Wiper 147 is driven by the servomotor until the difference of potential between wiper 147 and wiper 141 of network 140 is equal and opposite to the potential difference between wiper 85 and wiper 87 of network 80. Having set up this equal and opposite voltage, the aileron control network becomes balanced and the amplifier 65 ceases to operate. The servomotor 63 also ceases to operate and the ailerons remain as positioned.

The manually operated wiper 87 may thereby be moved so as to adjust the ailerons in any desired position. The ailerons are normally placed in center position by movement of wiper 87 and for this reason wiper 87 with its resistor 86 is generally termed the centering potentiometer.

Since wiper 147 and its resistor 146 are adjusted so as to balance the network, the resistor 146 with its wiper 147 are designated the servo balance potentiometer.

The aileron control network may also be unbalanced by the movement of wiper 85 from its electrical center on resistor 81. Wiper 85 is adjusted by means of a mechanical connection 90 extending from directional gyro 91. Gyro 91 is of the type disclosed in the aforesaid application 447,989, filed June 22, 1942. This directional gyroscope 91 senses any deviations of the airplane from a desired heading. When such deviations exist, the connection 90 adjusts the wiper 85 to unbalance network 80. A difference of potential thereby arises between wiper 85 and wiper 87 which is applied to amplifier 65. The amplifier 65 thereupon effects the rotation of the servomotor 63 which through shaft 62 and cable drum 61 positions the ailerons attached to cable 60. The servomotor 63 when operating, also drives the wiper 147 to set up a voltage between wiper 141 and wiper 147 equal but opposite to the voltage between wipers 85 and 87 to balance the aileron control network. When the network is thus balanced the amplifier 65 no longer operates and the servomotor 63 ceases to rotate.

The aileron control network may also be unbalanced by the adjustment of wiper 101 which has an operating connection 102 driven by a motor 103. The unbalance of network 94 due to a voltage arising from the displacement of wiper 101 from center tap 100 causes the operation of amplifier 65 and servomotor 63 which drives the wiper 147 to balance the aileron control network.

The aileron channel is unbalanced by movement of wiper 145 by vertical gyro 37 when the plane moves about its roll axis. The unbalance results in movement of the servomotor to adjust the ailerons and to rebalance the network.

The motor 103 which drives through operating connection 102, the wiper 101, is a capacitor type induction motor. One winding of this motor is energized by conductors 100 extending from the source of voltage. The other winding of the motor 103 is energized by the output of an amplifier 105. The direction of rotation of motor 103 depends upon the phase relationship between a control signal voltage applied to the control terminals of amplifier 105 and the voltage applied to amplifier 105 from the source as shown. The amplifier 105 is controlled by a circuit which includes a Wheatstone bridge 109 and which extends through lead 107 from one input terminal of amplifier 105 to an output terminal 114 of the bridge. The other terminal of the amplifier is connected through lead 108 to the other output terminal 117 of the bridge 109. The bridge 109 which controls amplifier 105 has two arms constituted by a course deviation potentiometer having a resistor 110 which has its opposite ends connected through leads 111 and 112 to the respective ends of a secondary winding 113 which has a primary winding 30. A wiper 114 which constitutes one output terminal of the bridge may be adjusted over the surface of resistor 110. The opposite two arms of the bridge are formed by a centering potentiometer having a resistor 116 which has its opposite ends connected by means of leads 111 and 112 to the respective ends of secondary winding 113. A wiper 117 which constitutes the other output terminal for the bridge may be manually adjusted over the surface of resistor 116. In normal position the wiper 114 and the wiper 117 are in the electrical center of their respective resistors 110 and 116. If the wipers 114 and 117 are not at their electrical centers with the result that a potential difference exists between them the wiper 117 may be manually adjusted until there is no voltage between wipers 114 and 117.

The bridge 109 may be unbalanced by the movement of wiper 114 which receives such movement from directional gyro 91 through an operating connection 120. Such unbalancing of bridge 109 applies a control voltage to the control terminals of amplifier 105 and thereby causes the operation of amplifier 105 which controls the rotation of motor 103. Motor 103, through operating connection 102, positions the wiper 101 with respect to center tap 100. The connection 120 which drives wiper 114 is adjusted whenever the directional gyro 91 senses any deviation of heading of the aircraft from the desired heading. The motor 103 may effect a continued displacement of wiper 101 from its normal position even though the wiper 114 is restored to normal position.

The aileron control network may also be unbalanced by the operation of manual turn control knob 160. Manual turn control 160 is used to unbalance the aileron control network to selectively change the direction of movement of the aircraft. Since such change in direction of movement would be opposed by the directional gyro, the turn control knob 160 when operated actuates a conventional directional gyro transmission disabling means (not shown). Such means may be similar to that disclosed in the aforesaid application 447,989, filed June 22, 1942. The operation of knob 160 moves wiper 153 with respect to center tap 151 whereby a voltage between wiper 153 and center tap 151 is set up. This voltage difference is applied to the amplifier 65. The amplifier 65 thereupon operates and effects the rotation of servomotor 63 to position the ailerons. Servomotor 63 also adjusts the servo balance potentiometer 146, 147 to balance the input circuit to amplifier 65.

*Rudder control network*

The rudder (not shown) is operated by cables 200 attached thereto and extending from cable drum 201. Cable drum 201 is driven by shaft 202 from a servomotor 203. Servomotor 203 is similar to servomotor 13. The servomotor is reversibly controlled by an amplifier 205, which amplifier may be similar to amplifier 15. The amplifier 205 receives an input control signal across terminals 206, 207. The amplifier 205 also has load terminals 208 and 209 connected to the source of voltage 100. The output leads 204 extend from amplifier 205 to the servomotor 203. The control circuit for amplifier 205 includes sources of control voltages and extends from terminal 206, lead 210, impedance network 212, lead 221, impedance network 230, lead 240, to ground and to grounded terminal 207 of amplifier 205.

The impedance network 212 is in the form of a Wheatstone bridge. Two arms of this bridge are formed by a motor operated potentiometer having a resistor 213 which has its opposite ends connected by leads 214 and 215 to the respective ends of a secondary winding 216 of a transformer which has a primary winding 30. Wiper 217 may be adjusted along the surface of resistor 213. The other two arms of the bridge are formed by a centering potentiometer having a resistor 218 which has its opposite ends connected through leads 214 and 215 to the respective ends of the secondary winding 216. A wiper 219 may be adjusted along the surface of resistor 218.

Impedance network 230 is in the form of a Wheatstone bridge having two arms formed by a rate potentiometer having a resistor 231 which has its opposite ends connected to the respective ends of a secondary winding 234 by means of leads 232 and 233 of a transformer having a primary winding 30. A wiper 235 may be adjusted along the surface of resistor 231. The opposite two arms of the bridge are formed by a servomotor balance potentiometer having a resistor 236 which has its opposite ends connected through leads 232 and 233 to the respective ends of secondary winding 234. A wiper 237 may be adjusted along the surface of resistor 236. The wipers 235, 237 are normally at the electrical center of their respective resistors 231, 236 with no potential difference between the wipers.

In normal position the rudder control network is in balanced condition with no difference of potential existing between wipers 217 and 219 and no difference of potential between wiper 235 and wiper 237. Wiper 219 may be adjusted by manual means 220 to change the position of wiper 219 with respect to the electrical center of resistor 218. When so adjusted a difference of potential exists between wipers 217 and 219. This difference of potential is applied to amplifier 205 which causes its operation. The amplifier 205 effects the rotation of servomotor 203 which, through shaft 202, drives the cable drum 201. The cable drum 201, through cables 200, positions the rudder. At the same time, the servomotor 203, through shaft 238, adjusts wiper 237 with respect to the electrical center of resistor 236. Adjustment of wiper 237 results in a potential difference between wipers 235 and 237 equal and opposite to that existing between wiper 217 and wiper 219. The equal and opposing voltages thereby balance the rudder network. The amplifier 205 due to the balance receives no input signal and ceases to operate; and the servomotor 203 consequently no longer rotates. The rudder maintains its set position.

Normally, wiper 219 is adjusted by the manual means 220 until the rudder is in center position. The manual means 220 with its wiper 219 and resistor 218 is designated the centering potentiometer since it permits the centering of the rudder.

The rudder network may also be unbalanced by movement of wiper 217. Wiper 217 is moved by a motor 251 through an operative connection 250. Such unbalancing of the network by movement of wiper 217 causes the operation of amplifier 205 which effects the rotation of servomotor 203 to rebalance the network.

The motor 251 which drives wiper 217 is a capacitor type of induction motor. The motor has two windings, one of which is supplied from the source of voltage by conductors 100. The other winding is supplied by the output of an amplifier 252. The amplifier 252 receives a supply voltage through conductors 100. The amplifier 252 has an input control circuit extending through lead 253, network 260, lead 270, resistor 271, to ground and to grounded lead 254 of amplifier 252. The amplifier 252 controls the direction of rotation of motor 251. This direction of rotation of motor 251 depends upon the phase relationship between the control voltage supplied leads 253 and 254 which are connected to the control side of amplifier 252 and the supply voltage from source conductors 100 connected to the amplifier 252.

The impedance network 260 which determines the phase of the control signal is in the form of a Wheatstone bridge. In this bridge two arms are formed by a yaw potentiometer having a resistor 261 whose opposite ends are connected by means of leads 262 and 263 to the opposite ends of a secondary winding 264 of a transformer having a primary winding 30. Wiper 265 may be adjusted along the surface of resistor 261. The opposite two arms of the bridge are formed by a centering potentiometer having a resistor 266 which has its opposite ends connected by means of leads 262 and 263 to the respective ends of secondary winding 264. A manually operable wiper 267 may be adjusted along the surface of resistor 266. In normal position, the wipers 265 and 267 are at the electrical centers of their respective resistors 261 and 266. When the wipers are thus centered, there is no difference of potential between the wipers. Should a difference of potential exist, the wiper 267 may be manually adjusted until such difference of potential disappears.

The wiper 265 is adjusted by means of an operative connection 268 from a vane 269. When the bridge is thus unbalanced by movement of wiper 265, the amplifier 252 receives an input control signal and operates. The operating amplifier 252 thereupon effects the rotation of motor 251. Motor 251 in turn operates through its mechanical connection the wiper 217 to unbalance the rudder network which causes the resulting positioning of the rudder.

The vane 269 is deflected in proportion to the magnitude and direction of the instantaneous yaw. The wiper 265 is therefore positioned in accordance with the instantaneous yaw. Amplifier 252 applies to motor 251 a voltage proportional to the yaw and the speed of motor 251 depends on the magnitude of the voltage applied. Motor 251 positions wiper 217 at a very low speed. The wiper 217 assumes a position that is the integral or summation of the instantaneous yaw values.

The vane 269 is mounted in the path of the air stream. The vane 269 pivots whenever there is an angular difference between the direction of movement of the aircraft and the direction of movement of the air through which the craft moves or when the aircraft is not headed in the direction that it is moving. Whenever such angular difference exists, the aircraft is in a condition of yaw. The purpose of the vane 269 is to sense when yaw exists and to effect operation of the rudder whereby the aircraft may be turned and the yaw may be removed.

The amplifier 252 is not only controlled by the voltage difference existing between wipers 265, 267 of impedance network 260, it is also controlled by a voltage drop existing in resistor 271. The voltage drop in resistor 271 is derived from a velocity signal generator 280.

The generator 280 is driven from motor 251 through a mechanical drive connection 281. The purpose in supplying amplifier 252 with a velocity signal is to prevent the continued rotation of motor 251 when there is no potential difference between wipers 265 and 267 or when bridge 260 is balanced. The amplifier 252 operates as long as there is a potential difference between wipers 265 and 267. Such potential difference exists as long as the vane 269 is displaced from its normal position. The vane 269 is only displaced from its normal position when the aircraft is in yaw. Therefore, the amplifier 252 operates as long as the aircraft is in yaw. The motor 251 will operate as long as the amplifier 252 operates. However, it may be that, due to its inertia of rotation, the motor 251 may rotate even after the amplifier 252 ceases to operate due to the balancing of bridge 260. This operation of the motor 251 beyond the time that amplifier 252 operates may be prevented by slowing down the rotation of the motor before the point of balance is reached by wiper 265, as the voltage difference between wipers 265 and 267 decreases. Such slowing down is provided by the velocity signal derived from generator 280, and applied across voltage divider resistor 271. The voltage output of generator 280 is proportional to the speed of the motor 251 and is of such phase as to oppose the voltage supplied to amplifier 252 by network 260. Since, as stated, the speed of motor 251 is proportional to input signal voltage and the signal input voltage is the yaw signal minus the velocity generator voltage which latter is proportional to motor speed, the speed of motor 251 is approximately proportional to the magnitude of yaw. Since the signal from generator 280 is proportional to the speed of the motor it controls, its effect is removed when the motor stops. The voltage across resistor 271 supplied by generator 280 always opposes the signal voltage calling for the motor operation. By the application of the proper velocity signal along with the signal from impedance network 260, the motor will stop rotating when the amplifier 252 ceases to operate. If the voltage selected from voltage divider 271 is too small the motor 251 will not have stopped rotating when bridge 260 is balanced, if the voltage selected is too large the motor will rotate very slowly after its speed is decreased, until bridge 260 is balanced.

Figure 2:
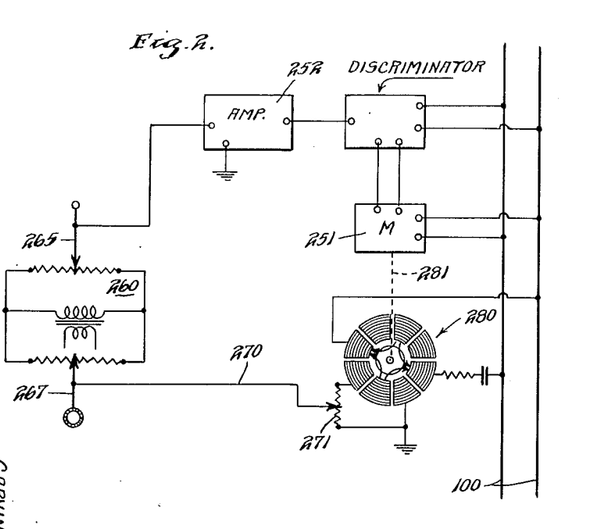
Figure 2 is a schematic arrangement of a velocity motor and its control elements

The velocity generator is shown in greater detail in Figure 2 associated with impedance network 260, amplifier 252, and motor 251. In Figure 2 the amplifier 252 is expanded and is shown as comprising an amplifying section and a discriminator section. The output from the discriminator section is utilized to reversibly control the rotation of motor 251. The velocity signal generator 280 is shown as driven from motor 251. The velocity signal generator 280 is made up of two windings—on two sets of poles each—and a special rotor. The action of this mechanism is as follows: the primary winding is wound on every other pole of the eight poles and is constantly energized through a resistor and a condenser from source conductors 100. The action of the condenser is such that it causes the voltage across the primary to be approximately one quarter cycle out of phase with the line voltage from the source 100. The resistor is used merely to reduce the voltage. The physical relationship of the primary and secondary windings as shown in Figure 2 is such that no voltage is induced in the secondary as long as the rotor is stationary. The rotor of the velocity signal generator 280 is made of a solid, iron cylinder with a thick shell of aluminum applied to its outer surface. The solid iron core acts as a good conductor of magnetic flux, but is not so good an electrical conductor as the aluminum shell around it. When the rotor turns, current is induced in the aluminum shell of the rotor. This current sets up its own magnetic field, which lags the primary field sufficiently so that it is at a maximum when cutting the secondary winding. Therefore, a voltage is induced in the secondary winding which is of such a phase relationship to the line voltage that it subtracts from the original signal supplied by the network 260. These two signals—the velocity signal and the original signal—add algebraically to produce the total signal to the amplifier. This total signal provides a smooth drive up to the point of no yaw with a gradual slowing down to a stop as the position of no yaw is reached.

The wiper 235 of network 230 in the rudder control network receives its motion from a rate gyro 290 through an operative connection 291. The movement applied to connection 291 results from the precessing action of the rate gyro 290. The gyro 290 is arranged so that it precesses in response to two external factors one being due to the movement of the aircraft about the turn axes and the other being due to torque applied from motor 251 through operative shaft 281. This torque is proportional to the instantaneous yaw of the aircraft as sensed by the vane.

Figures 3, 4:
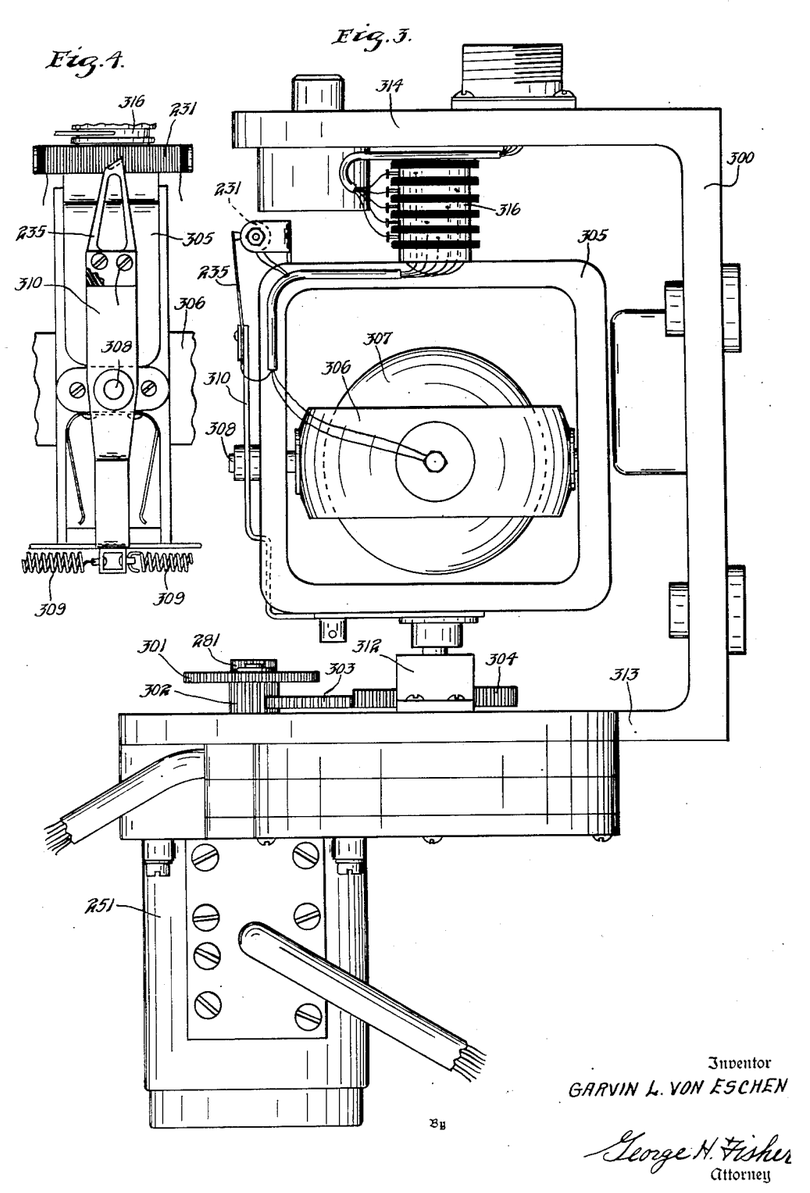
Figure 3 is a view of a rate gyroscope used in the system of Figure 1
Figure 4 is a view of a portion of the gyroscope of Figure 3

The rate gyro is illustrated in detail in Figure 3. A channel shaped base member 300 supports for rotation on one side thereof the motor 251. The motor shaft has a pinion 281 mounted thereon which drives step down gearing members 301, 302, 303, and 304. The gear 304 is fastened to a trunnion of a Cardan ring 305. The Cardan ring 305 is pivotally mounted in the upper side member 314 of the channel 300 and in a bracket 312 secured to the lower side member 313 of the channel 300. The Cardan ring 305 pivotally supports therein a second Cardan ring 306. A rotor 307 is rotatably carried by the Cardan ring 306. A trunnion 308 of Cardan ring 306 projects beyond the surface of Cardan ring 305. This trunnion 308 has secured thereon a wiper lever 310. One end of this lever may carry the contact member 235 which engages the surface of resistor 231. The opposite end of lever 310 is affixed to biasing springs 309 which restore the displaced lever 310 to normal position. The rotor 307 comprises part of an A. C. motor which is supplied with voltage from a collector ring 316 as shown.

The gyroscope is mounted in the aircraft so that a side portion 314 of the base 300 is horizontal and also parallel to the pitch axis of the aircraft as which may be determined by the arrow pointing in the direction of flight, Figure 1. When thus mounted the gyro 307 is subject to precessing action whenever the aircraft moves about its turn axis. When the aircraft moves about its turn axis the gyro 307 will precess and will rotate about the axis of trunnions 308 to displace the lever 310 from its normal position and thereby displace the wiper 235 affixed thereon from the electrical center of resistor 231. Since the rotor moves under the restraining action of springs 309, the extent of rotation of lever 310 depends upon the rate of movement of the aircraft about the turn axis. The voltage signal derived from the displacement of wiper 235 is therefore proportional to the rate of movement of the aircraft about its turn axis. With such means, a rate signal is derived which is applied to the rudder control network.

The torque derived from the rotation of motor 251 and applied to the trunnion of Cardan ring 305 by intermediate gearing 302, 301, 303, and 304 also causes the gyro 307 to precess about the axis of trunnion 308. Such precessing action of the rotor 307 also causes the rotation of lever 310 to displace it from its normal position. The lever 310 is spring biased to normal position and therefore the displacement of lever 310 from a normal position is proportional to the torque applied to Cardan ring 305 from motor 251 and is therefore proportional to the speed of motor 251. The speed of motor 251 is proportional to the voltage applied thereto. This voltage is determined by the direction and extent of movement of wiper 265. The movement is proportional to the yaw as sensed by vane 269. Therefore the displacement of lever 310 and wiper 235 is proportional to the instantaneous yaw.

The resultant displacement of lever 310 is determined by the precessing action arising out of the movement of the aircraft about the turn axis and also the rate of rotation of motor 251. On occasions the precessing action of gyro 397 due to the movement of the airplane about its turn axis may be equal and opposite to the precessing action resulting from the torque applied by motor 251. On such occasions the lever 310 is not displaced from its normal position.

While, as illustrated, a single gyro subject to two precessing initiating forces has been shown, it is obvious that two separate rate gyros with coacting wipers and resistors may be utilized. One such gyro would be mounted so as to provide a signal proportional to the rate of movement of the aircraft about its turn axis. The other gyroscope would be mounted so as to be subject to the force applied by motor 251 but not subject to a precessing force due to the movement of the plane about the turn axis.

Operation

The operation of the system will be considered when an aircraft is being automatically stabilized on a selected heading. If the heading of the aircraft is rapidly changed due to air turbulence, the directional gyro 91 will sense the departure of the heading of the craft from the desired heading. The directional gyro 91 will thereby through its operative connection 90 displace wiper 85 of network 80, thereby upsetting the balance of the aileron control network. Amplifier 65 thereupon operates to effect the rotation of servomotor 63 which applies such aileron as to cause the aircraft to bank toward the desired direction of heading. We may assume that the heading of the aircraft has been changed by the turbulent air to the right of the desired heading. The directional gyro senses the change of heading to the right and moves wiper 85 to the left of the electrical center of resistor 81. Movement of wiper 85 sets up an unbalanced left signal in the input circuit of amplifier 65. Amplifier 65 causes servo 63 to raise left aileron and depress right aileron. Servomotor 63 also drives wiper 147 to left of the electrical center of resistor 146 until aileron amplifier input circuit is balanced. In this manner the ailerons will be automatically controlled by the directional gyro to move the right aileron in a down position and the left aileron in an up position whereby the airplane is banked to the left.

When the aircraft is placed in a banked position, the vertical flight gyro 37 responds to the movement of the aircraft about the roll axis and through its operative connection 149, adjusts the wiper 145 to the right of the electrical center of resistor 141 to set up a preponderant right voltage signal in the aileron network. This control signal from the vertical gyro operates amplifier 65 and servomotor 63 which causes the ailerons to be moved back to normal position. Wiper 147 is also moved to center position. It is necessary to move the ailerons to normal position or to recenter the ailerons in order to maintain the airplane in the desired angle of bank which is proportional to the signal from the directional gyro 91. If the ailerons had remained in partially operated position the plane would tend to increase its bank. The left signal of wiper 85 balances the right signal of wiper 145.

In addition to setting up an aileron recentering control in the aileron control network, the movement of the plane about the roll axis also causes the vertical gyro 37 to transmit motion to the wiper 34 of network 22 in the elevator control network through an operative connection 36. Wiper 34 is therefore displaced from center tap 30 to apply a signal to amplifier 15 and causes the amplifier 15 to effect rotation of servomotor 13. Servomotor 13 moves servo balance wiper 47 to rebalance the elevator network and also supplies up elevator in proportion to the movement of wiper 34. The application of up elevator prevents the loss of altitude while the plane is changing its direction of flight.

The aircraft changes its direction of flight under the effect of the banking of the plane and moves toward the desired direction of heading.

The operation of the rudder will now be considered. When an aircraft is proceeding in flight, it has considerable momentum when any gust of air strikes it from one side, the momentum of the aircraft tends to carry it in the direction in which it is moving, and the airgust tends to force the plane in the direction of the gust. The resultant movement of the aircraft is in such a direction that it has a direction of movement at an angle with respect to the direction of the airgust. In other words the aircraft has a heading which is at an angle to the direction of the relative air. The aircraft is then in a yawed condition.

The yawed condition of the aircraft has arisen very rapidly due to the conditions assumed. It was assumed that the gust was applied to the left side of the aircraft. Since such yawed condition arose rapidly the motor 251 has not displaced wiper 217 to any great extent. The displacement of wiper 217 is small because the motor 251 drives the wiper at a very slow rate and the time in which the yaw has arisen has been of very short duration. The motor 251 precesses the gyro 290 in proportion to the magnitude of the yaw which the plane has at the moment. The motor precessed gyro under the action of the motor 251 therefore increases its signals from a zero value to a maximum value.

The gyro 290 being also affected by the turning movement of the plane has its rate of turn signal at a maximum when the plane begins to yaw and this rate signal from the turning of the plane decreases to zero when the yawed position of the aircraft is checked. When the yawed position of the aircraft is checked, the yaw is at a maximum but its angular movement is zero. At this time, therefore, the motor precessed gyro signal from motor 251 being proportional to the yaw is at its maximum value whereas the movement of gyro 290 by the turning action of the plane is reduced to zero since the plane is at a momentary standstill when the yaw is at a maximum.

During the setting up of the yawed condition therefore the motor precessed gyro and the rate gyro signal reinforce one another. The combined signal from the rate gyro 290 for purpose of discussion moves the wiper 235 to the left of the electrical center of resistor 231. The new position assumed by wiper 235 unbalances network 230 and the amplifier 205 is energized. The amplifier 205 causes the servomotor 203 to position or to apply left rudder. At the same time the motor 203 through the follow up 238 moves wiper 237 to the left of the electrical center of resistor 231 so that there is no potential difference between wipers 235 and 237 and the rudder network for controlling amplifier 205 is balanced and the servomotor stops operating.

When the banked airplane changes its direction of movement so that it moves toward the desired heading, the rate gyro, being subjected to any movement of the airplane about its turn axis, precesses to the right or in the opposite direction from the original direction of precession and sets up a signal in the rudder control calling for right rudder or less left rudder. The rate gyro therefore displaces or has an effect which tends to move the wiper 235 from its left position toward the right position. The previously operated rudder tends to cause the aircraft to turn so that yaw is removed. The motor precessed gyro signal therefore decreases with the decrease in yaw. The original signal derived from the movement of wiper 235 has therefore been decreased due to the opposite action of the rate gyro or turning effect of the aircraft on the rate gyro 290, therefore, the wiper 235 is moved from its left position toward the center of resistor 231. This causes an unbalance in the rudder network controlling amplifier 205 and the servomotor operates to move its rudder from a left position toward the center position and it also moves the wiper 237 from the left position toward the center position of resistor 236. The resulting position of wiper 235 depends upon the proportionate effect of the value of the yaw signal applied by motor 251 to precess gyro 299 and the rate of turning of the aircraft applied to gyro 290.

I have stated that the aircraft moves toward the desired heading due to its being placed in a left bank. The movement of the aircraft toward the desired heading decreases the deviation signal in directional gyro 91, therefore, wiper 85 is moved toward the right from its left displaced position. The aileron network is thereby unbalanced and the amplifier 65 controls servomotor 63. Servomotor 63 moves the ailerons from the normal or center position and wiper 147 to the right of the center of resistor 146. In other words the right aileron is moved upward from its center position. The repositioning of the ailerons decreases the amount of bank of the aircraft. Since the plane is now at a decreased angle of bank its rate of turning is reduced and therefore the rate gyro signal becomes smaller. The position assumed by the rudder at this time depends upon the relative value of the rate signal as derived from the turning action of the plane and the amount of yaw signal applied by the motor 251 to precess gyro 299. If these two opposing effects on the gyro 290 are the same there will be no relative displacement of wiper 235. The wiper 235 would therefore be at the electrical center of resistor 231 and the rudder would be in center position and the wiper 237 accordingly would also be in the center position of resistor 236.

Up to this time the operation of the aileron network may be briefly summarized. The original movement of directional gyro 91 has moved wiper 85 to the left thereby placing an unbalanced left signal in the aileron network. The servomotor 63 was thereby energized to move the right aileron in a down position and to move wiper 147 to the left of the center of resistor 146 to balance the deviation signal from the directional gyro. At this point the vertical gyro operated wiper 145 was at the center.

In view of the fact that the right aileron was down the plane assumes a banked position. This left bank assumed by the aircraft causes the vertical gyro 37 to move wiper 45 to the right of the center of resistor 141. An unbalanced right signal therefore is present in the amplifier network and this causes the servomotor 63 to place the ailerons in center position and to move wiper 147 to the center of resistor 146 to balance the network. The plane under the left bank moves toward the desired heading. The deviation signal decreases as the plane moves toward the desired heading, and the wiper 85 is moved toward the right from its left displaced position. This movement of the wiper 85 results in an unbalanced right signal in the aileron network, and the servomotor 63 drives the right aileron to an up position and also moves wiper 147 toward the right from the center of resistor 146. The application of up right aileron causes the aircraft which is in a left bank to assume a less steep angle of bank and the vertical gyro 37 responds and moves wiper 145 toward the left from its right position. This results in an unbalanced left signal in the amplifier network and the servomotor 63 drives the aileron back to center position and wiper 147 to the center position of resistor 146. The action is continuous and when the aircraft has reached the desired heading the wipers 85, 145 and 147 are at the electrical centers of their respective resistors.

At the same time the vertical gyro 37 has moved the wiper 34 in the elevator network back toward the center of resistor 24. This movement of wiper 34 has caused the elevators to be placed in a center position and wiper 47 is at the center of resistor 45.

If at the time the aircraft has reached its desired heading the aircraft has steadied on this heading the rate gyro effect due to the turning of the aircraft will be zero and the aircraft not being in yaw the motor precessed gyro signal will be zero, therefore, the rudder will be centered.

Should the aircraft have any turning velocity when the aircraft has reached its desired heading the rate gyro will provide a signal due to the turning action of the plane to the rudder network, but the yaw now being zero, gyro 299 is not precessed by motor 251. This signal will be such as to apply right rudder to check the tendency of the aircraft to overshoot the desired heading.

The operation of the device may be now considered when the amount of yaw has built up over a considerable period of time. Due to the fact that motor 251 reversibly drives wiper 217 at a slow rate, the wiper 217 assumes a position which is an integration of the yaw over a considerable period of time. We may restrict ourselves to a discussion of the rudder network and its control devices and dispense with the inclusion of the aileron and elevator controls. If the aircraft is in yaw due to an out of trim condition and the yaw has built up over a considerable time interval the wiper 217 may be displaced from the center of resistor 213. Assume that over the integrated interval the yaw has been to the right. At this time wiper 217 will be to the left of the center of resistor 213 in proportion to the integrated amount of yaw. Wiper 235 will be displaced to the left of the center of resistor 231. The position assumed by wiper 235 is the result of the combined effect of the turning movement of the aircraft about its vertical axis and the precession of the gyro 299 by the motor 251. Initially as yaw is impressed on the aircraft the rate gyro signal will be at a maximum and the motor precessed gyro signal will be at a minimum whereas the integrated signal will depend upon the value of the integration up to this point. The motor precessing effect increases up to the point where yaw is checked. At this point the rate signal due to the turning of the aircraft about the vertical axis is zero. Up to this point the signal on the gyro 290 due both to the turning effect of the aircraft and the precessing effect of motor 251 combines to displace wiper 235 to the left of the center of resistor 231. The wipers 217 and 235 being to the left an unbalanced left signal is present in the rudder circuit of amplifier 205. The amplifier 205 causes the servomotor 203 to position wiper 237 to the left of the center of resistor 236. The rudder network is thereby balanced and it may be observed that wiper 237 would be farther to the left from the center of resistor 236 than wiper 235 is to the left of the center of resistor 231.

As in the previous operation the deviation signal of the directional gyro resulting from the yawed position of the aircraft would cause the aircraft to turn to the left.

When the aircraft begins to turn toward the left from the position of maximum yaw the rate gyro signal changes from a left value to a right value.

When the plane is at the maximum yaw position the deviation signal is at a maximum. A maximum deviation signal would cause the operation of the ailerons to position the aircraft in the steepest bank depending upon the value of the deviation signal. Since the plane at this point would have roughly its greatest banking angle it would turn at the greatest rate of speed. Shortly after the position of maximum yaw therefore the rate of turn of the aircraft is at its maximum and the rate gyro signal would be at its maximum. It has been shown that the bank of the airplane decreases as the plane approaches the desired heading. With such decrease in bank the rate of turn of the aircraft decreases and the rate gyro signal would decrease also. The value of the yaw signal derived from the motor precessed gyro also decreases as the plane approaches its desired heading. The signal from the gyro 290 due to the precessing action of motor 251 and due to the turning effect of the aircraft are in opposition at this time. If these signals are equal and opposite the signal determining the position of the rudder is that derived from the integrated position of wiper 217. This as stated is to the left and therefore the servomotor has operated the wiper 237 to the left to balance the network and has also applied left rudder. Should the effect of the motor 251 on gyro 290 be reduced to zero when the aircraft has reached the desired heading and should the turning effect of the aircraft upon gyro 290 also be zero on the desired heading the rudder will position in accordance with the integrated signal. If the two signals from the gyro 290 are zero the aircraft is at zero yaw when it is on its desired heading. At this time the rudder has an offset position to the left. This position was determined by the position of wiper 217. It may be necessary to carry the amount of left rudder determined by the position of wiper 217 in order to balance for the out of trim condition of the aircraft. The aircraft will continue on course with the rudder so trimmed.

Should the amount of rudder carried be in excess of that required, the aircraft will veer toward the left and be placed in a yawed condition. The vane 269 will sense this yaw to the left and cause the motor 251 to move the wiper 217 to the right from its left displaced position. The rate gyro due to the effect of the turning of the aircraft will also set up a right signal to correct for the turning action. By the above means the aircraft is steadied on the desired heading and the amount of rudder trim necessary to maintain the direction of flight is established by the position of wiper 217.

Figure 5:
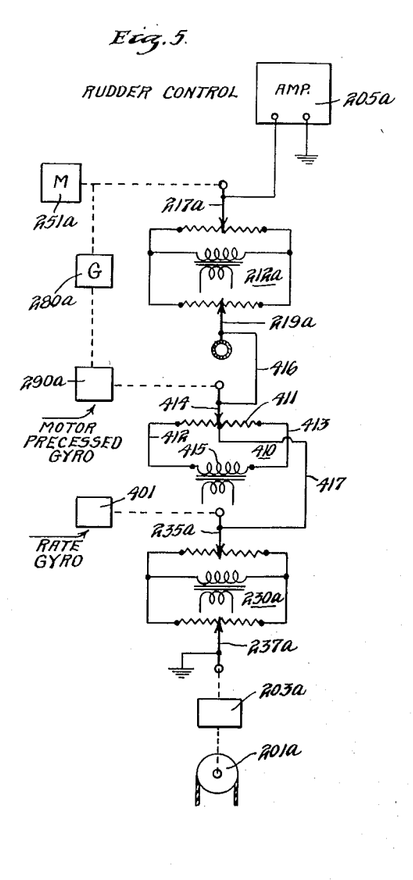
Figure 5 is a modified arrangement of a rudder control network.

A modified arrangement for controlling the rudder is shown in Figure 5. In Figure 5 impedance networks 212a and 230a correspond to the similar networks 212 and 230 of Figure 1. Since in the arrangement of Figure 5, I propose to include two gyroscopes, one precessed by the motor 290 and one responsive to the turning action of the plane, it is necessary to provide additional wipers and resistors. The additional resistor is provided in the network 410. The network 410 includes a potentiometer having a resistor 411 which has its opposite ends connected by means of leads 412, 413 to a secondary winding 415 of the transformer. A wiper 414 may engage the surface of resistor 411. Wiper 414 is driven from motor 290a which corresponds with motor precessed gyro 290 of Figure 1. Lead 416 connects wiper 414 with wiper 219a of network 212a. The resistor 411 has a center tap which is connected by means of lead 417 to wiper 235a of impedance network 230a.

The wiper 235a of impedance network 230a is driven by a rate gyro 401. This rate gyro is of the conventional spring restrained type. The rate gyro 401 may be of the type similar to that used in rate of turn indicators. In the conventional rate of turn gyroscope, the gyro rotor is rotatably carried in a Cardan ring on a horizontal axis of rotation. The Cardan ring itself is rotatably carried by supporting members on an axis perpendicular to the axis of rotation of the gyroscope. One of the trunnions of the Cardan ring may have an arm mounted thereon which arm is engaged by opposing springs which bias the arm into a normal position. When the plane moves about its turn axis, the gyro rotor will cause the Cardan ring to rotate about its trunnion due to the precessing action of the rotor during the turning movement of the plane. The movement of the trunnion carires the arm against the opposition of the biasing spring. This arm mounted on the trunnion of the Cardan ring may have its movement supplied to wiper 235a. The gyro 290a, in the modified arrangement is mounted with the base portion of the channel parallel to the pitch axis so that the torque to motor precess the gyro is about an axis parallel to the pitch axis. The control network for motor 251a is the same as that for motor 251 of Figure 1 and has been omitted in Figure 5 for purposes of clarifying the illustration. It is understood, however, that motor 251a is also controlled by an amplifier. The amplifier itself is controlled by a Wheatstone bridge which has one wiper under the operation of a vane. This vane corresponds to vane 269 of Figure 1.

In the arrangement of Figure 5 the function of the rate gyro due to the movement of the plane about its turn axis has been separated from the function of the motor precessed gyro which is precessed in accordance with the magnitude of instantaneous yaw. It is considered that the arrangement of Figure 5 may bring out more clearly the function of the automatic control features for the rudder.

As previously stated the wiper 217A is moved at a very slow rate, and its position at any time from the center of its resistor is roughly an integration or a summation of the values of yaw for a considerable period of time. The motor precessed gyro 290a moves its wiper 414 in accordance with the instantaneous values of yaw. The rate gyro 401 moves wiper 235A in accordance with the rate of movement of the plane about its turn axis.

An airplane may be in yaw due to a permanent out of trim condition of the aircraft or it may be due to the abrupt force on the plane exerted by turbulent air. Where the plane develops yaw due to an out of trim condition, it may be necessary to carry an offset rudder that is a rudder displaced from its center position in order to maintain an aircraft on the desired heading.

Suppose in one instance that the aircraft has built up its magnitude of yaw over a considerable period of time. In this case wiper 217a is displaced in accordance with the integration of yaw for the period and the wiper 414 is displaced in proportion to the instantaneous yaw. The rate gyro 401 does not provide a signal since the rate of turn of the plane is low. The amount of rudder applied to correct for the yaw is then a function of the displacement of wipers 217A and 414. The application of rudder as a result of the displacement of wipers 217A and 414 causes the amount of the yaw of the aircraft to decrease. As the amount of yaw decreases the wiper 414 moves toward the zero position on resistor 411. However, the wiper 217A continues in a displaced position. At zero yaw, therefore, there is no signal from the motor precessed gyro but there may be a signal from the displacement of wiper 217A depending on the integration value. I have stated that motor 251A that drives the wiper 217A rotates very slowly therefore the displacement of wiper 217A is very small. If, at the time the plane regains a zero yaw position, it is not turning, the amount of signal remaining in impedance network 212A to determine the rudder position is determined by the displacement of wiper 217A. This displacement may serve as a measure of determining the amount of offset rudder to maintain the aircraft in flight without yaw.

The advantage of the combination of signals obtained from the operation of the motor precessed gyro 290a and the motor 251a applied to wipers 414 and 217a respectively may now become apparent. If the motor precessed gyro had been omitted and the wiper 217A been moved at a faster rate than previously mentioned to thereby apply an amount of rudder to remove the yaw, it is apparent that when the aircraft returned to zero yaw position that the large displacement of wiper 217A, as the result of its increased rate, is retained as yaw decreases and would cause the aircraft to swing beyond a zero yaw position. This would result in a hunting action before the craft steadied on zero yaw. By providing a signal having two components, the larger one being such as set up by wiper 414 which signal reduces when the plane returns to zero yaw, a more steady return with minimum hunt is obtained for the aircraft.

If, despite the combination of a motor precessed gyro signal and the motor displacement signal, the aircraft should have considerable rate of turn at the point of zero yaw it is necessary to provide some means for damping any over shooting of zero yaw that might occur. Such means is provided by the rate gyro 401. While the aircraft moves from its maximum yaw condition to a zero yaw condition, the rate gyro 401 sets up a signal opposing that provided by the displacement of wipers 414 and 217A. By means of the rate gyro 401, therefore, if at the time the aircraft has returned to an unyawed condition, it has a residual turning momentum. The rate gyro 401 will continuously set up a signal to counteract this over shooting tendency or tendency to turn beyond no yaw position. If the turning rate when the plane reaches zero yaw is large the rate gyro would apply opposite rudder to return the aircraft to unyawed flight. Without the rate gyro, it would have been necessary for the aircraft to go beyond its unyawed position and assume a position of yaw in the opposite direction. This would result in the motor 251A positioning its wiper 217a to the opposite side of the electrical center of its resistor. At the same time the motor precessed gyro would move its wiper 414 to the opposite side. However, under the conditions assumed, the yaw arose out of an out of trim condition of the aircraft and it would be desirable to maintain a partial trim of the rudder in the direction first assumed to counteract the initial yaw. By providing the rate gyro 401, it is unnecessary for the motor 251A to be driven in the opposite direction to remove the hunting action of the aircraft. Any tendency of the aircraft to over-shoot or to hunt is damped by the rate gyro 401.

In the arrangement described, I have provided a system in which a large signal is introduced by wipers 217A and 414 to permit rapid correction for yaw and which also provides a means whereby a portion of this signal is eliminated when the aircraft is at zero yaw since the wiper 414 will have been returned to its zero position.

Also in order to reduce any tendency of the craft to over-shoot or hunt due to the residual signal arising out of displacement of wiper 217A, the rate gyro 401 sets up an opposing signal 235A to dampen this hunting action.

Where the yaw in the aircraft in another instance is the result of a turbulent condition of the air, the yaw arises very quickly. In the resulting corrective action wipers 217a and 235a control in view of the fact that the yaw arose quickly and the wiper 217A has not been displaced very far from its zero position of its resistor. In such case, the signals controlling the positioning of the rudder arise from the motor precessed gyro, the rate gyro, and the servomotor. Initially as the yaw is set up, the motor precessed gyro and the rate gyro have like signals and the servomotor positioned its wiper 237A to set up an equal but opposing signal to that impressed by the rate gyro and the motor precessed gyro. When the aircraft has reached a maximum point of yaw, it is not turning and therefore the rate gyro signal decreases to zero. The servomotor therefore returns its rudder toward the zero position to still balance the signal from the motor precessed gyro. As the aircraft now moves from its maximum yawed condition, the rate gyro sets up a signal opposed to that of the motor precessed gyro signal. Since the rate gyro signal opposes that from the motor precessed gyro the rudder is moved still more toward the center position. We may assume that the rate gyro signal will be proportional to the rate of turning of the aircraft about its turn axis and therefore also proportional to the rate of change of yaw of the aircraft. The motor precessed gyro sets up a signal proportional to the instantaneous magnitude of yaw. The aircraft moves under the effect of the rudder toward unyawed condition. If at the time the plane reaches unyawed condition the motor precessed gyro signal is zero and the rate gyro signal is zero this is an indication that the aircraft has no yaw and is not changing its yaw or that the aircraft is on a steady course in unyawed flight.

On the other hand, if at the time the aircraft reaches an unyawed position which means also that the motor precessed gyro has returned its wiper 414 to zero position, the aircraft has an angular momentum, in other words, has an angular rate of turn, the rate gyro would set up a signal to oppose this tendency of the aircraft to swing beyond the unyawed position. Any tendency of the aircraft to move beyond the unyawed position would be checked by the rate gyro signal which would apply opposite rudder to tend to eliminate hunting action of the aircraft beyond the desired heading.

It is now evident that I have provided a novel flight control apparatus which incorporates new and distinct rudder control features. The rudder control includes a rate gyro responsive to two precessing effects and which tends to stabilize the aircraft on a desired heading. This rate gyro coacts with yaw detecting devices to effect an immediate large displacement of the rudder to check the abrupt increase in yaw of the aircraft, and to return the rudder toward zero displacement as the amount of yaw of the aircraft decreases under the effect of the displaced rudder to thereby prevent the aircraft from turning beyond the position of zero yaw. The apparatus, however, not only provides means for quickly applying maximum rudder to eliminate abrupt yaw, but also includes means to adjust the rudder to a position displaced from zero position to permanently compensate for any inherent tendency of the aircraft to yaw.

I claim as my invention:

1. In a flight control system for an aircraft having a control surface for controlling the craft about its vertical axis, operating means for said control surface, control means for said operating means, a first signal generating means operated in response to the angular deviation between the longitudinal axis of said craft and the relative direction of movement of said aircraft and the air and providing a signal proportional to said deviation, a second signal generating means operated in accordance with the duration and magnitude of the angular deviation, and means combining the operations of said first and second signal means and connected with said control means.

2. In a control system for an aircraft having a vertical axis and positioned thereabout by a rudder control surface, a wind vane responsive to the direction of movement of the relative air, a first signal generating means operated by said vane in proportion to extent and duration of vane deflection, a second signal generating means responsive to rate of turn of said craft about said axis, control means operated by said first and second signal generating means, and an operating means for said control surface connected with said control means.

3. Flight control apparatus for an aircraft having a rudder control surface, said apparatus comprising: operating means for said control surface, control means for said operating means, yaw sensing means, motor driven means operated by said yaw sensing means at a rate proportional to the angular difference of heading of the craft and direction of movement of the relative air, signal means operated by said motor driven means to provide a signal proportional to the rate and duration of said motor operation, signal means connected to and moved in accordance with the rate of operation of said motor driven means, and means for connecting both signal means with said control means to position said rudder in proportion to the magnitude and integral of magnitude of said relative air direction.

4. In a flight control system for an aircraft having a control surface, power means for driving said control surface, control means for operating said power means, means responsive to the relative direction of movement of said aircraft and air, motor means controlled by said responsive means, a control device operated by said motor means, a gyroscope operatively connected with the motor means and precessed thereby, a control device operated by said gyroscope, and means combining the operations of said devices and connected with said control means.

5. In a flight control system for an aircraft having a control surface, power means for actuating said control surface, control means for operating said power means, a first means including a wind vane responsive to the relative direction of movement of said aircraft and the air, a second means including a motor controlled by said responsive means and operated at a rate in accordance with the vane displacement, a control device operated by said motor, a gyroscope, means operatively connecting said motor and said gyroscope whereby said motor may effect precession of said gyroscope in accordance with its rotation rate, means for biasing said gyroscope to unprecessed position, a control device operated by said gyroscope, a control device operated by said power means, and means combining the operations of said three control devices and connected to said control means.

6. Flight control apparatus for an aircraft having a rudder control surface comprising, power means for positioning said control surface, control means for said power means, a wind vane responsive to the relative direction of movement of said aircraft and air, means including a control device controlled by said vane and remaining displaced when the vane returns to zero relative direction position, means including a second control device moved in accordance with the rate of movement of said first control device, means including a third control device responsive to the rate of craft rotation about the vertical axis thereof, a follow-up control device operated by said power means and means combining the operations of said control devices and connected with said control means.

7. In a flight control system for an aircraft having a control surface, operating means for said control surface, control means for said operating means, a wind operated means moved in proportion to the angular difference between the heading and direction of movement of the air relative to said craft, a motor operated by said wind means, a control device operated by said motor, a restrained gyro operated by said motor in accordance with its rate of movement, a control device operated by said gyroscope, a second gyroscope precessible in accordance with the rate of movement of said aircraft about an axis, a control device operated by said second gyroscope, and means combining the operations of said control devices and connected with said control means.

8. Flight control apparatus for an aircraft having a rudder control surface comprising, operating means for said control surface, control means for actuating said operating means, wind responsive means moved in proportion to the relative direction of movement of the aircraft and the air, a motor means operated by said wind responsive means, a control device operated by said motor, means including a gyroscope precessible by said motor in accordance with its rate of movement, said gyroscope also being responsive to the movement of the aircraft about a vertical axis, a control device operated by said gyroscope, and means combining the operations of said control devices and connected with said control means.

9. In a control system for a craft having a control surface, operating means for said control surface, control means for said operating means, a means responsive to skidding or side slip movement of said craft in the medium in which it moves, motor means including a control device operated by said responsive means, a restrained gyroscope means operated by said motor means and which precesses in accordance with the rate of operation of said motor means, a restrained gyroscope means responsive to the movement of the craft about one of its axes, a control device operated by each gyroscope, and means combining the operations of said control devices and connected with said control means.

10. In a control system, a condition responsive means, a signal generating device operated by said responsive means in accordance with the magnitude of said condition, a variable speed motor means controlled by said signal generating device, gyroscope means precessed by said motor means according to the rate of operation of said motor means, gyroscope means responsive to the rate of change of a second condition, a signal generating device operated by each gyroscope, an operable load device, control means connected with said load device for operation thereof, and connections from said gyroscope operated signal generators to said control means whereby said gyroscope means differentially control said load device.

11. In a flight control system for an aircraft having aileron and rudder control surfaces, each control surface having power means and controlling the movement of the aircraft about one of two respectively perpendicular axes, a directional gyroscope operated control device responsive to the deviation in heading of the aircraft and connected with one power means for operating the aileron control surface, a wind vane operated means responsive to the direction of movement of the relative air resulting from the operation of said aileron control surface, a motor operated control device connected to said operated means, a control device operated in accordance with the rate of operation of said motor means and biased to a normal position, a control device operated by said rudder power means, and means combining the operation of the last three control devices and connected with said rudder power means, and craft tilt responsive means including a control device responsive to the position of the aircraft about an axis as effected by said aileron control surface, said tilt control device being adapted to additionally effect operation of said aileron power means.

12. In a flight control system for an aircraft having aileron, rudder, and elevator control surfaces normally in unoperated position, each control surface controlling the movement of the aircraft about one of three respectively perpendicular axes, power means for positioning each control surface, control means for each said power means, a first operable means including a control device responsive to the deviations of said aircraft from a desired heading and connected with the aileron control means for effecting movement of the aileron power means, a second means including a control device responsive to the position of the aircraft resulting from operation of said aileron power means, said control device being connected with said aileron control means for returning said control surface to unoperated position, a control device operatively connected with said second responsive means and connected to the elevator control means to effect operation of the elevator power means, means including a wind vane operatively responsive to the direction of the relative air resulting from operation of said aileron power means, a motor means including a control device operated in accordance with the displacement of said wind vane, means including a control device operated in accordance with the rate of movement of said motor, and means combining the operation of the last two control devices and connected with the rudder control means.

13. Control apparatus for an aircraft comprising: aileron power means, rudder power means; craft heading sensing means; control means for operating each power means; a voltage generating control device for operating the aileron power means control means and driven by said heading sensing means and by said aileron power means, whereby said craft is banked in proportion to changes in heading; wind operated controller means having a normal position and displaced therefrom in response to the direction of the air relative to said craft; motor means subject to said controller means including a second voltage generating control device operated as long as the wind means is displaced, said control device remaining in operated position when said motor ceases operation; a third voltage generating control device operated by said motor means in proportion to the rate of operation of said motor means; and means for combining the voltages of said second and third control devices and connected to said rudder power control means.

14. Control apparatus for an aircraft having a control surface, comprising: power means for positioning said control surface; a voltage responsive control means for operating said power means; means including a restrained gyroscope responsive to one condition of said craft; a voltage generating control device operated on precession of said gyroscope; a second restrained gyroscope responsive to a second condition of said craft; a voltage generating control device operated on precession of said second gyroscope; a follow-up voltage generating control device operated by said power means; and means for providing a resultant voltage by combining the voltages of all said control devices and connected to said control means to effect operation of said surface in accordance with said resultant voltage.

15. Control apparatus for an aircraft having a control surface, comprising: power means for actuating said control surface; control means for said power means; means responsive to change in a condition of said craft and operating a signal device in proportion to the magnitude of such change; motor means, means driven by said motor means in accordance with its rate of movement for providing a signal; control means for said motor means connected to said control device and said signal providing means so that the motor moves at a rate in accordance with the magnitude of such change in condition; a restrained gyroscope having two axes of freedom and precessed about one axis by said motor means in accordance with its rate of movement; a control device operated by said gyroscope; a means connecting said last control device with said power means control means.

16. Control apparatus for an aircraft having ailerons and rudder, said apparatus comprising: aileron power means; craft heading sensing means, control means for said aileron power means; a control device operated by said heading sensing means for operating the aileron power means control means, whereby one aileron is lowered and the other is raised to place said aircraft in a banked position on changes in heading; rudder power means; control means for operating said rudder power means; a rate of turn gyroscope responsive to the rate of turn of the craft about its vertical axis; a signal device operated by said rate of turn gyroscope for operating the rudder power means control means for applying rudder to offset the tendency of the downwardly positioned aileron to increase the heading deviation; means having a normal position and displaced therefrom in response to the direction of the air relative to said aircraft; motor means including a further control device operated by said relative air responsive means in accordance with the duration of the displacement of said means; and means for controlling said rudder power control means from said further control device to oppose the gyroscope control device while the craft is regaining the desired heading.

17. Control apparatus for an aircraft having aileron and rudder control surfaces, said apparatus comprising: means for operating said ailerons to bank said aircraft; control means for positioning said rudder; means responsive to the rate of turn of said craft about its vertical axis for operating said control means; sensing means operated in proportion to the relative direction of movement of said craft and air; a control device operated in proportion to the magnitude and duration of operation of said sensing means; and means for operating said control means from said control device.

18. In a control system, a condition responsive device deriving a control signal proportional to the magnitude of change in the condition, motor means operatively controlled by said signal and having a rate of operation proportional to said signal, a first control device operated by said motor means and deriving a second control signal proportional to the rate and duration of operation of said motor means, a second control device operated by said motor means in accordance with its rate of operation and deriving a third control signal proportional thereto, means for combining the second and third signals, and regulating means controlled by said combining means for removing said condition change.

19. Control apparatus for an aircraft comprising: means responsive to a condition of said craft for providing a signal proportional to the amount of change in said condition; variable speed motor means; motor rate signal providing means operated by said motor means; means connected to both signal providing means and said motor means for controlling the rate of operation of said motor means in accordance with the change in said condition; a signal generating means also operated in accordance with the rate of movement of said motor means; control surface actuating power means; control means for said power means; and means for operating said control means from said last named signal generating means and effecting operation of said power means proportional to the magnitude of the generated signal.

GARVIN L. VON ESCHEN.

REFERENCES CITED

The following references are of record in the file of this patent:

UNITED STATES PATENTS

| Number | Name | Date |
| --- | --- | --- |
| 1,485,781 | Ferdon | Mar. 4, 1924 |
| 1,497,164 | Behr | June 10, 1924 |
| 1,958,258 | Alexanderson | May 8, 1934 |
| 1,966,170 | Greene | July 10, 1934 |
| 2,408,069 | Hull et al. | Sept. 24, 1946 |
| 2,463,585 | Young | Mar. 8, 1949 |